(12) United States Patent
Verbosky (10) Patent No.: US 11,280,449 B2
(45) Date of Patent: Mar. 22, 2022

(54) LUBRICANT APPLICATION TOOL FOR LINE HOSE

(71) Applicant: KV Line Safety, LLC, Uniontown, PA (US)

(72) Inventor: Keith T. Verbosky, Uniontown, PA (US)

(73) Assignee: KV Line Safety, LLC, Uniontown, PA (US)

( * ) Notice: Subject to any disclaimer, the term of this patent is extended or adjusted under 35 U.S.C. 154(b) by 568 days.

(21) Appl. No.: 16/351,677

(22) Filed: Mar. 13, 2019

(65) Prior Publication Data

US 2019/0285226 A1    Sep. 19, 2019

Related U.S. Application Data

(60) Provisional application No. 62/642,697, filed on Mar. 14, 2018.

(51) Int. Cl.
| | |
|---|---|
| *F16N 15/00* | (2006.01) |
| *H01B 19/04* | (2006.01) |
| *B65D 83/20* | (2006.01) |
| *F16N 25/00* | (2006.01) |

(52) U.S. Cl.
CPC ........... *F16N 15/00* (2013.01); *B65D 83/201* (2013.01); *H01B 19/04* (2013.01); *F16N 25/00* (2013.01); *F16N 2210/34* (2013.01); *F16N 2270/74* (2013.01)

(58) Field of Classification Search
CPC ........ F16N 7/30; F16N 15/00; F16N 2210/00; F16N 2210/34; F16N 3/02; F16N 7/34; F16N 13/22; F16N 2270/70; F16N 11/00; F16N 7/00; B65D 83/201; H01B 19/04
USPC .......... 222/182, 402.13, 645; 184/15.1–15.3, 184/55.1
See application file for complete search history.

(56) References Cited

U.S. PATENT DOCUMENTS

| | | | | |
|---|---|---|---|---|
| 2,728,608 | A | * | 12/1955 | Marini ................. B65D 83/267 239/274 |
| 2,800,874 | A | * | 7/1957 | Leslie .................... B44D 3/225 118/301 |
| 2,928,573 | A | * | 3/1960 | Edelstein .................. A61L 9/14 222/649 |
| 2,942,631 | A | * | 6/1960 | Biewald .................... A47K 5/12 141/360 |
| 2,967,643 | A | * | 1/1961 | Edelstein ............. B65D 83/262 222/647 |

(Continued)

*Primary Examiner* — Paul R Durand
*Assistant Examiner* — Michael J. Melaragno
(74) *Attorney, Agent, or Firm* — McKay Law (57) ABSTRACT

A hose lubricating tool for power line hoses. A backboard has a support plate mounted on the front surface. The backboard has a lip portion below the support plate integral with the bottom half. A hinge is mounted to the front surface and attached thereto is a finger base, the finger base mounted to the hinge on the front surface. An indentation is defined within the finger base underneath the front edge. A finger portion is mounted to the finger base, the finger portion extending out over a finger front edge of the finger base to define a finger tip, the finger tip and finger portion sized to be received within a groove of a power line hose. Upon the power line hose being forced along the finger tip, the finger base is urged downward to engage the trigger and release the lubricant.

14 Claims, 6 Drawing Sheets

(56) References Cited

U.S. PATENT DOCUMENTS

| | | | | |
|---|---|---|---|---|
| 3,127,065 A * | 3/1964 | Stevenson | B65D 83/20 | 222/164 |
| 3,228,609 A * | 1/1966 | Edelstein | B65D 83/386 | 239/70 |
| 3,269,601 A * | 8/1966 | Weber, III | B65D 83/262 | 222/647 |
| 3,269,608 A * | 8/1966 | Weber, III | B65D 83/262 | 222/180 |
| 3,269,610 A * | 8/1966 | Fuls | B65D 83/386 | 222/183 |
| 3,347,468 A * | 10/1967 | King | B65D 83/267 | 239/274 |
| 3,368,717 A * | 2/1968 | Weber, III | B65D 83/262 | 222/648 |
| 3,549,059 A * | 12/1970 | Sloan | B65D 83/30 | 222/402.15 |
| 3,565,213 A * | 2/1971 | Heller | H02G 1/08 | 184/15.2 |
| 3,587,332 A * | 6/1971 | Bell | A61J 7/0481 | 74/54 |
| 3,662,958 A * | 5/1972 | German | B65D 83/267 | 239/274 |
| 3,828,890 A * | 8/1974 | Schott | D07B 7/12 | 184/15.1 |
| 3,858,762 A * | 1/1975 | Meshberg | B05B 11/3052 | 222/180 |
| 3,994,440 A * | 11/1976 | Mancini | B65D 83/267 | 239/274 |
| 4,009,764 A * | 3/1977 | Hafner | F16N 7/02 | 184/15.2 |
| 4,089,440 A * | 5/1978 | Lee | B65D 83/202 | 222/174 |
| 4,098,436 A * | 7/1978 | Kohlbeck | B65D 83/202 | 222/182 |
| 4,103,806 A * | 8/1978 | White | B65D 83/40 | 220/724 |
| 4,111,338 A * | 9/1978 | Cheng | B65D 83/386 | 222/180 |
| 4,120,380 A * | 10/1978 | Mann | B62J 31/00 | 184/15.1 |
| 4,223,812 A * | 9/1980 | van Lit | B65D 83/386 | 222/180 |
| 4,401,240 A * | 8/1983 | Brack | B65D 83/202 | 222/323 |
| 4,428,510 A * | 1/1984 | Iglesias | B65D 83/267 | 222/180 |
| 4,428,512 A * | 1/1984 | Nosek | B65D 83/201 | 222/402.15 |
| 4,554,998 A * | 11/1985 | Kenny | F16N 21/04 | 184/105.1 |
| 4,651,902 A * | 3/1987 | Hobbs | A47K 5/1211 | 222/153.09 |
| 4,789,083 A * | 12/1988 | Gutierrez | B65D 83/267 | 222/108 |
| 4,815,637 A * | 3/1989 | Nellis | B62J 31/00 | 184/15.1 |
| 4,838,456 A * | 6/1989 | Hamlin | B65D 83/201 | 141/363 |
| 5,086,955 A * | 2/1992 | Anglen | B05B 12/16 | 222/402.15 |
| 5,409,145 A * | 4/1995 | Payne | B65D 23/12 | 222/212 |
| 6,237,812 B1 * | 5/2001 | Fukada | B65D 83/201 | 222/181.2 |
| 7,100,805 B2 * | 9/2006 | Bulsink | B65D 83/267 | 222/180 |
| 8,444,020 B1 * | 5/2013 | Kenny | B65D 83/203 | 222/174 |
| 2004/0182648 A1 * | 9/2004 | Ludwig | B65D 83/208 | 184/15.3 |
| 2006/0076366 A1 * | 4/2006 | Furner | B05B 12/122 | 222/402.13 |
| 2006/0138175 A1 * | 6/2006 | Germain | B67D 1/0004 | 222/321.8 |
| 2006/0157499 A1 * | 7/2006 | Mancel | A61M 35/25 | 222/135 |
| 2009/0223745 A1 * | 9/2009 | Marcucci | B65D 83/201 | 184/15.2 |
| 2011/0024460 A1 * | 2/2011 | Smrt | B65D 83/203 | 222/174 |
| 2019/0285226 A1 * | 9/2019 | Verbosky | F16N 15/00 | |

* cited by examiner

FIG. 8 ial application Ser. No. 62/642,697 filed Mar. 14, 2018, the
LUBRICANT APPLICATION TOOL FOR LINE HOSE

CROSS-REFERENCE TO RELATED APPLICATIONS

The present application claims benefit of provisional application Ser. No. 62/642,697 filed Mar. 14, 2018, the contents of which are herein incorporated by reference.

BACKGROUND

Field of the Invention

The present invention relates to a means for applying a lubricant to a power line hose. Particularly, the instant invention is a tool for securing a silicon lubricant canister and allowing for the release of the spray lubricant as a line hose is dragged across a trigger.

Description of the Related Art

Power line work can be done when the power lines are "hot". When power lineman work on the lines, large rubber line hoses are applied over the power lines for safety. The line hoses are very heavy, and their placement is aided by the use of a silicon lubricant. The silicon lubricant also is regularly applied to prevent abrasions and degradation of the line hoses. A defective line hose would be an extreme danger if used. In the industry the lubricant is applied by holding a spray can, while another individual unfolds the power line hose to reveal the inside, thus requiring two line men for its application.

Aerosol spray can trigger accessories are known in the art. For instance, U.S. Pat. No. 4,089,440 to Lee teaches a handle attachment which snap engages over the top of an aerosol can and includes a trigger adapted to depress the spray button. The device fits most sizes of cans and adaptor rings may be provided to ensure a firmer sup-port for smaller cans. The handle attachment and associated aerosol can may be secured to and elevated on a pole or other elongated support and operated remotely for spraying of trees, buildings, and the like. A partially rotatable shroud is provided which, when in one position, enables the trigger to be operated in order to dispense the contents of the can through the spray nozzle and when in the other position, prevents the trigger from being depressed and also shrouds the nozzle if the can is improperly placed within the assembly.

U.S. Pat. No. 4,098,436 to Kohlbeck shows a universal spray can holder which is longitudinally adjustable to securely hold an aerosol spray can and features an integral trigger mechanism to actuate the can valve. A built-in safety hood protects the spray can operator from missprayings, and from inhaling either can contents or can propellant.

U.S. Pat. No. 4,401,240 to Brack describes a holder for a cannister having a valve which is typically used for aerosol spraying is provided. The holder securely grips a cannister bead and is provided with a handle having a valve actuator for actuating the valve on the cannister. The holder provides improved stability by surrounding and supporting the body of the cannister so that it can be shaken or moved rapidly without disengagement from the cannister.

U.S. Pat. No. 8,444,020 to Kenny shows an assembly for hand held or remote elevated operation of most modern style aerosol cans. The assembly comprises a frame having a handle, a saddle, a swiveling threaded adaptor, and an activating linkage. An aerosol can is held to the device with a clamp. For use in a manual fashion, the user may grasp the handle and depress a lever link of the activating linkage, such with a thumb or palm of a hand. For use in an elevated position, the assembly can be threaded onto a painters' extension pole using an indexing adaptor. The can may then be elevated, and the user can activate the assembly simply by pulling down on a tether.

U.S. Patent Pub. No. 20060157499 describes an apparatus which releases a sunless tanning product from one or more containers for uniform spray application to the skin of the user. In a preferred embodiment, the apparatus is structured as a vertical tower and a plurality of containers are held in spaced vertical alignment so that each container is positioned in operative alignment below an actuator lever. A control knob is operatively linked to the actuator levers, whereupon operation of the control knob serves to move the actuator levers to simultaneously depress discharge nozzles on each of the containers, thereby causing sprayed release of the sunless tanning product with the assistance of a propellant, such as aerosol. In the preferred embodiment, the control knob is connected to a cam mechanism which, upon rotation thereof, serves to move a linkage to operate the levers relative to the discharge nozzles of the containers between an off position and an on position. The tower is surrounded by a housing having vertically arranged nozzle openings aligned with the nozzles of the spray containers.

Needed then is a tool which addresses the needs within the power line industry and thereby enables the more efficient application of a lubricant across a power line hose.

SUMMARY

Comprehended is a tool for enabling the application of a lubricant across a power line hose. A clamp secures a lubricant canister against a resting plate. A brace further secures the canister. A hingedly-attached and also spring-mounted trigger plate penetrates the groove of the hose while concurrently pressing the canister release, wherein as the hose is dragged across a finger portion of the trigger plate the lubricant is sprayed to the underside thereof.

More particularly, comprehended is a hose lubricating tool, comprising a backboard having a top half, a bottom half, a front surface and a bottom surface; a support plate mounted on the front surface at the bottom half extending generally perpendicularly from the front surface; the backboard having a lip portion below the support plate integral with the bottom half; a hinge mounted to the front surface at the top half; a finger base having a front edge, the finger base mounted to the hinge on the front surface at the top half extending generally perpendicularly from the front surface when in a relaxed state; an indentation defined within the finger base underneath the front edge; a finger portion mounted to the finger base, the finger portion extending out over a finger front edge of the finger base to define a finger tip, the finger portion sized to be received within a groove of a power line hose; a torsion spring connected to the hinge to urge the finger base into the relaxed state; one or more clamps on the top surface, each clamp aiding to secure a cannister of lubricant along the backboard and over the support plate such that a trigger for the cannister is positioned underlying the finger tip; wherein, upon the power line hose being forced along the finger tip, the finger base is urged downward to engage the trigger and release the lubricant.

DETAILED DESCRIPTION OF THE PREFERRED EMBODIMENT

Referencing then FIGS. 1-8 shown is the instant hose lubricating tool 1. A sturdy backboard 2 is provided having a top half 3, a bottom half 4, a front surface 5 and a bottom surface 6. Backboard 2 can be made of any rigid material such as wood, compressed fiberglass or other composite. Backboard 2 serves to seat most components of the instant tool. For instance, a support plate 7 is mounted on the front surface 5, preferably at the bottom half 4, extending generally perpendicularly (perpendicular but for small variations from manufacturing or wear) from the front surface 5 as shown. In this manner a shelf for the cannister 17 is provided. The support plate 7 is mounted to the backboard 2, in the exemplary embodiment, using press-fit composite inserts inserted through insert holes 20 and secured using button head socket cap screws (not shown). The support plate 7 is mounted towards the bottom half 4 as indicated, but only so far as to leave a portion of backboard 2 accessible, termed herein lip portion 8. The lip portion 8 below the support plate 7 is preferably integral with the bottom half 4 and thus co-planar. Although not shown, a rigid plate can be added to this lip portion 8 section to lessen wear and tear from use. For example, a metal plate secured to the front surface 5 or back 23 prohibits damage to the backboard 2, held in a vertical position between the vice, as further described below.

A hinge 9 is mounted to the front surface 5, at the top half 3 as shown. Hinge 9 is either a spring hinge 9 or any type of plate, butterfly or butt hinge 9 which includes an additional torsion spring 15. Hinge 9 allows for an angle of rotation between backboard 2 and finger base 10. Finger base 10 has a front edge 11 and is mounted to the hinge 9 on the front surface 5 at the top half 3 extending generally perpendicularly from the front surface 5 when in a relaxed state, i.e. movably held in place by torsion spring 15 when there is no downward compression force applied to finger base 10. Finger base 10 additionally has an indentation 12 defined therein underneath the front edge 11, thus the underside of the finger base 10 at this location is carved out so that a lubricant being sprayed from the cannister 17 is not interrupted by the overhead finger base 10.

A finger portion 22 is mounted to the finger base 10. The finger portion 22 extends out over a finger front edge 11 of the finger base 10 to define a finger tip 13. As such, the finger portion 22 is preferably longer (or deeper) than the depth of the finger base 10 to extend overhead. The finger portion 22 can be mounted to finger base 10 using similar connection means as the support plate 7, just here through the cap holes 21 of finger portion 22 (see FIG. 6). As such, the finger portion 22 and finger base 10 move together. The finger portion 22 with integral finger tip 13 is sized to be received within a groove of a power line hose 14 and because finger tip 13 has a variable length, it can penetrate and spread the power line hose 14 while the power line hose 14 concurrently can be dragged across finger base 10, typically rubbing front edge 11 of same as its dragged. Thus, this shape of the combined finger base 10 and finger portion 22 because it matches the characteristics of a power line hose 14.

Figure 1:
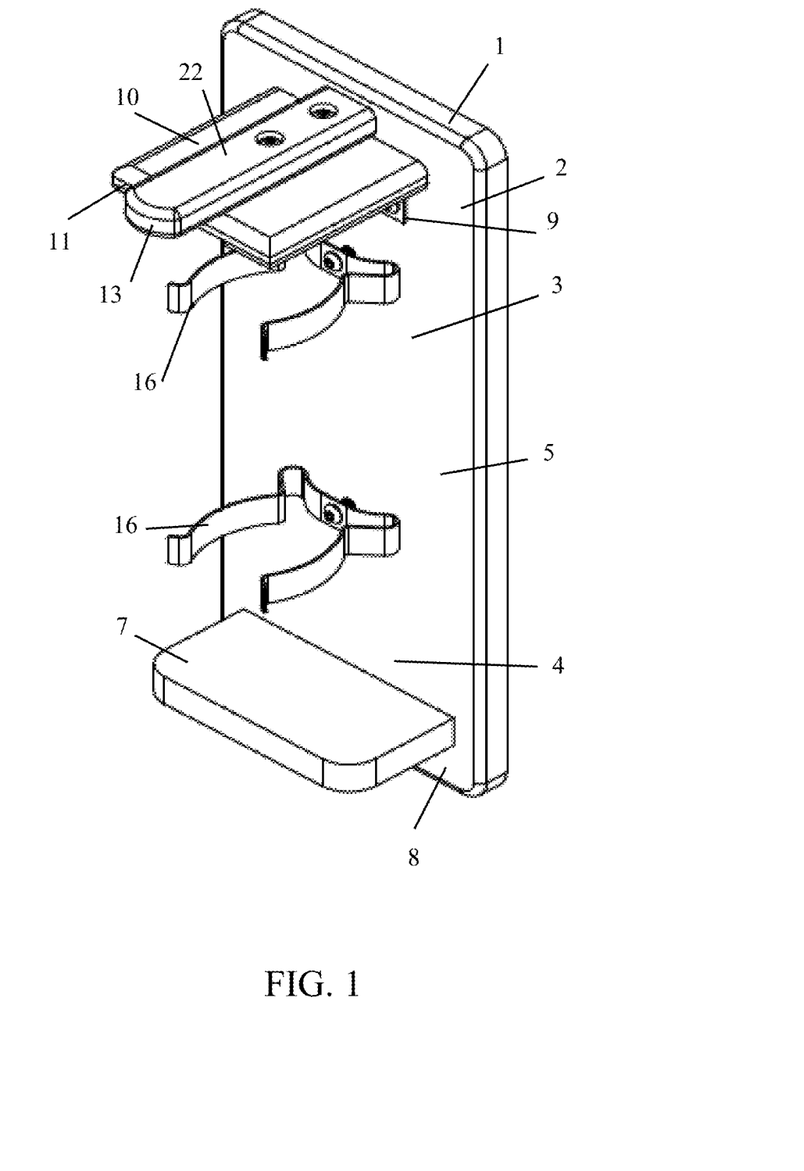
FIG. 1 shows a perspective view of the instant invention.
Figure 2:
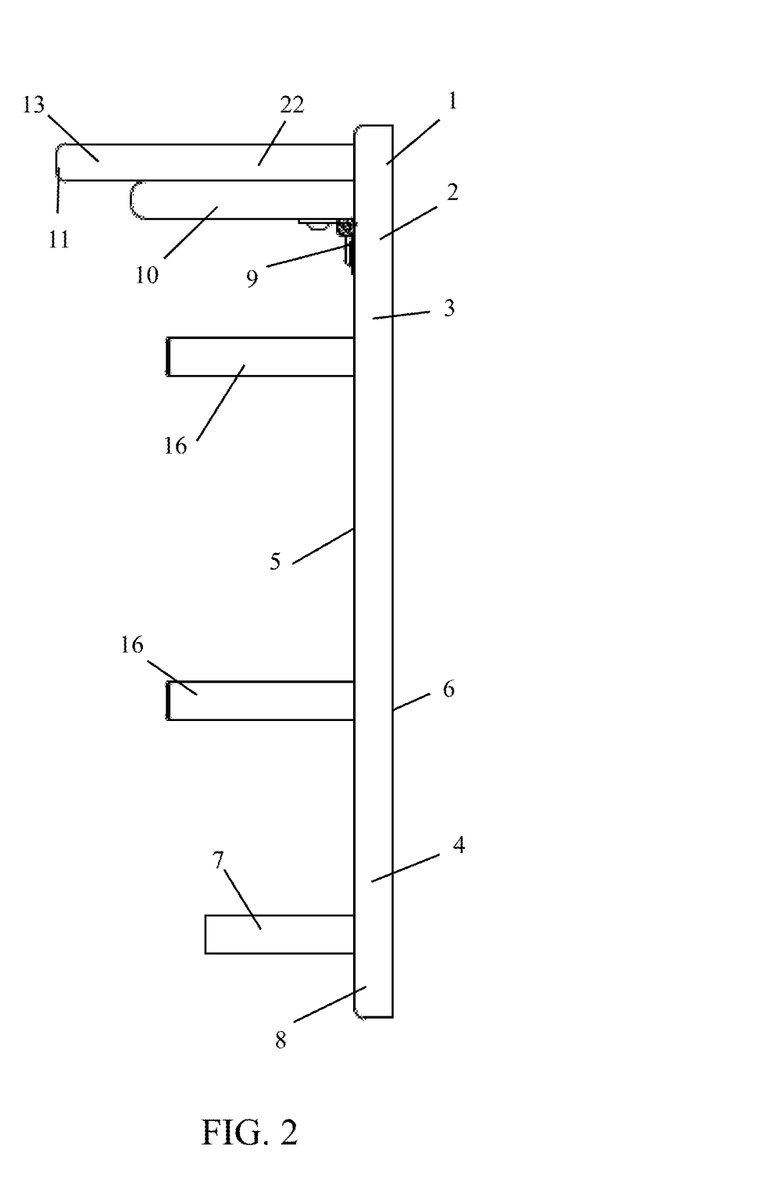
FIG. 2 shows side view thereof.
Figure 3:
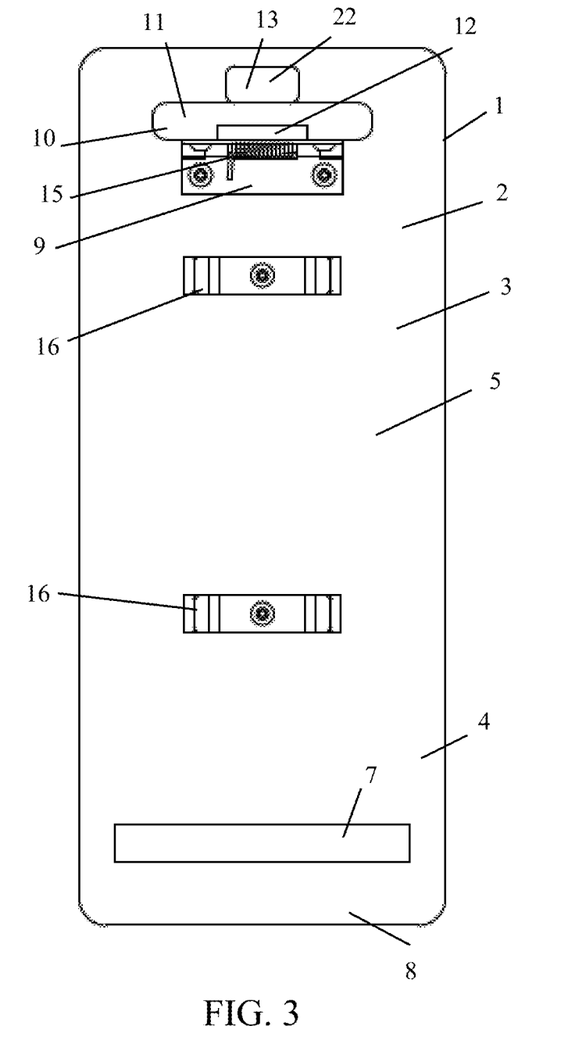
FIG. 3 shows a front view thereof.
Figure 4:
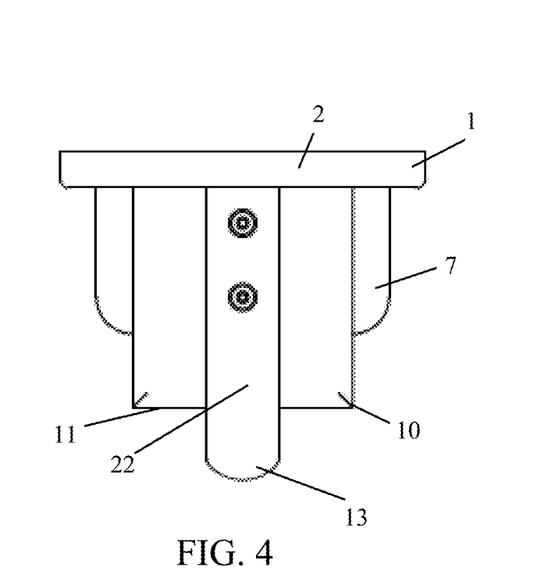
FIG. 4 shows a top view thereof.
Figure 5:
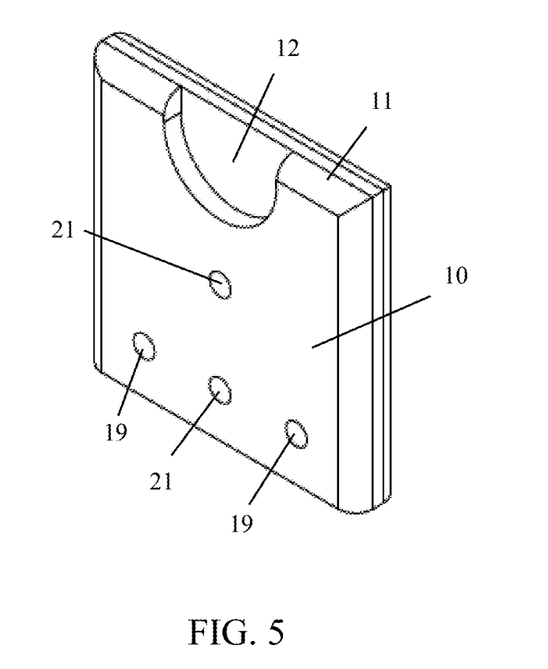
FIG. 5 shows a perspective view of the finger base including the lower surface.
Figure 6:
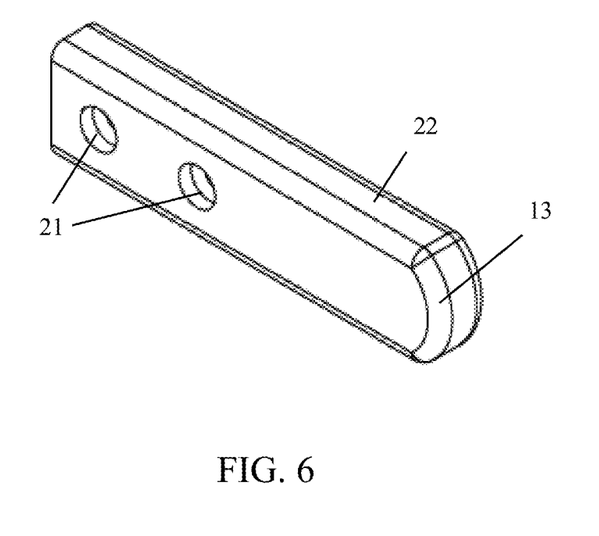
FIG. 6 shows a detailed perspective view of the finger.
Figure 7:
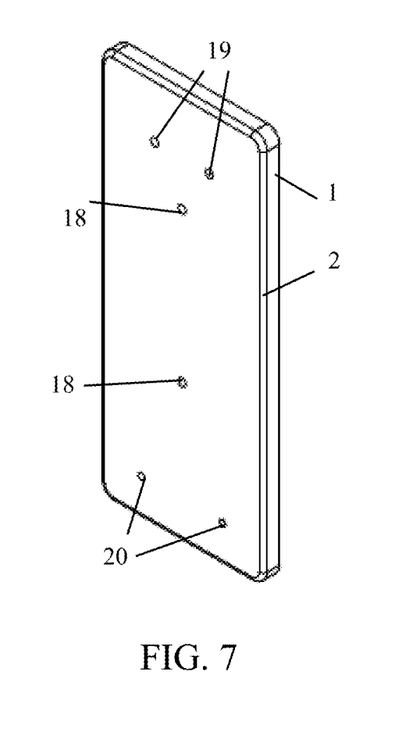
FIG. 7 shows a detailed perspective view of the backboard including the front surface.

One or more clamps 16 are secured on the top surface of the backboard 2 using similar inserts through socket cap screw holes 18 (FIG. 7). These preferably metal clamps 16, or brackets or spring-steel clips, aid to secure a cannister 17 of lubricant along the backboard 2 and over the support plate 7 such that a trigger for the cannister 17 is positioned underlying the finger base 10. In addition, the clamps 16 act as stabilizer plates that keep the cannister 17 from shifting laterally.

Figure 8:
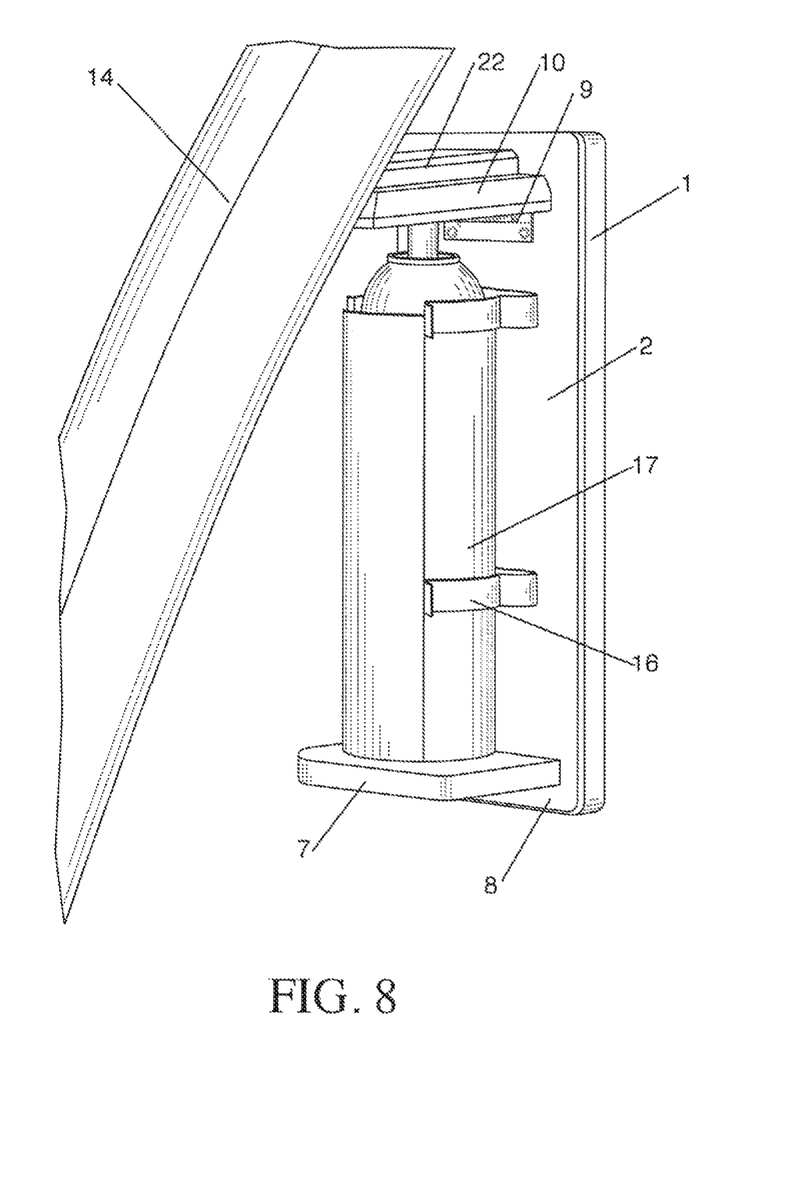
FIG. 8 shows a perspective view of the invention in use as the power line hose is dragged across the tool.

In use, therefore, and with particular reference to FIG. 8, the hose lubricating tool 1 is secured by having lip portion 8 captured within a vice, typically a vice which is truck-mounted as is generally known in the art. Hose lubricating tool 1 is thus maintained in a vertical position. A cannister 17 of silicon lubricant is disposed within the clamps 16 over support plate 7 aiming outward. A power line hose 14 is manually dragged across finger base 10 as finger tip 13 penetrates the groove of the power line hose 14, further spreading the line hose. The weight of the power line hose 14 causes the finger base 10 to move downward. Downward force is thereby applied to the silicon canister release button, releasing the lubricant outward and into the power line hose 14 as the power line hose 14 continues to be dragged down over the finger base 10. After use, the spray of the cannister 17 ceases as the finger base 10 is urged back into its upward, or relaxed position. Lubricant is thereby continuously applied to the underside/inside of the power line hose 14 as needed, eliminating the need to apply the lubricant manually, which typically requires multiple individuals.

I claim:

1. A hose lubricating tool, comprising:
   a backboard having a top half, a bottom half, a front surface and a bottom surface;
   a support plate mounted on said front surface at said bottom half extending perpendicularly from said front surface;
   said backboard having a lip portion below said support plate integral with said bottom half adapted to be received within a vice to maintain said backboard vertically;
   one or more clamps on said front surface, each said clamp aiding to secure a cannister of lubricant along said backboard and over said support plate such that a trigger for said cannister is positioned outward for release of said lubricant into a power line hose.

2. The tool of claim 1, further comprising a hinge mounted to said front surface at said top half.

3. The tool of claim 2, further comprising a finger base having a front edge, said finger base mounted to said hinge on said front surface at said top half extending perpendicularly from said front surface when in a relaxed state.

4. The tool of claim 3, further comprising a finger portion mounted to said finger base, said finger portion extending out over said front edge of said finger base to define a finger tip, said finger portion sized to be received within a groove of a power line hose.

5. The tool of claim 2, further comprising an indentation defined within said finger base underneath said front edge.

6. The tool of claim 2, further comprising a torsion spring connected to said hinge to urge said finger base into said relaxed state.

7. A hose lubricating tool, comprising:
a backboard having a top half, a bottom half, a front surface and a bottom surface;
a hinge mounted to said front surface at said top half;
a finger base having a front edge, said finger base mounted to said hinge plate on said front surface at said top half extending perpendicularly from said front surface when in a relaxed state;
a finger portion mounted to said finger base, said finger portion extending out over said front edge of said finger base to define a finger tip, said finger portion sized to be received within a groove of a power line hose;
one or more clamps along said backboard, each said clamp aiding to secure a cannister of lubricant along said backboard such that a trigger for said cannister is positioned outward and underlying said finger tip for release of said lubricant into said power line hose.

8. The tool of claim 7, further comprising an indentation defined within said finger base underneath said front edge.

9. The tool of claim 7, further comprising a torsion spring connected to said hinge plate to urge said finger base into said relaxed state.

10. The tool of claim 7, further comprising one or more clamps on said front surface, each said clamp aiding to secure a cannister of lubricant along said backboard and over said support plate such that a trigger for said cannister is positioned underlying said finger tip.

11. A hose lubricating tool, comprising:
a backboard having a top half, a bottom half, a front surface and a bottom surface;
a hinge plate mounted to said front surface at said top half;
a finger base having a front edge, said finger base mounted to said hinge plate on said front surface at said top half extending generally perpendicularly from said front surface when in a relaxed state;
an indentation defined within said finger base underneath said front edge;
wherein, upon said power line hose being forced along said finger base, said finger base is urged downward to engage a trigger of a cannister.

12. The tool of claim 11, further comprising a finger portion mounted to said finger base, said finger portion extending out over a finger front edge of said finger base to define a finger tip, said finger portion sized to be received within a groove of a power line hose.

13. The tool of claim 11, further comprising a torsion spring connected to said hinge plate to urge said finger base into said relaxed state.

14. The tool of claim 12, further comprising one or more clamps on said front surface, each said clamp aiding to secure a cannister of lubricant along said backboard such that a trigger for said cannister is positioned underlying said finger tip, wherein, upon said power line hose being forced along said finger tip, said finger base is urged downward to engage said trigger and release said lubricant.

* * * * *